United States Patent [19]
Miyawaki

[11] Patent Number: 5,999,237
[45] Date of Patent: *Dec. 7, 1999

[54] LIQUID CRYSTAL DISPLAY DEVICE INCLUDING A TORIC PRISM LENS HAVING AN ASPHERIC MIRROR MOUNTED ON A POLARIZING MEANS

[75] Inventor: Mamoru Miyawaki, Isehara, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/655,603

[22] Filed: May 30, 1996

[30] Foreign Application Priority Data

Jun. 1, 1995 [JP] Japan ................................ 7-156650
May 24, 1996 [JP] Japan ................................ 8-151829

[51] Int. Cl.$^6$ ..................... G02F 1/1335; G02F 1/136; G02B 27/14
[52] U.S. Cl. ................. 349/57; 349/42; 349/62; 349/95; 359/631
[58] Field of Search .................. 349/42, 43, 62, 349/95, 57; 359/631

[56] References Cited

U.S. PATENT DOCUMENTS

| | | | |
|---|---|---|---|
| 4,212,048 | 7/1980 | Castleberry | 350/338 |
| 4,556,312 | 12/1985 | Vany | 355/47 |
| 4,708,439 | 11/1987 | Ishii et al. | 349/57 |
| 4,726,662 | 2/1988 | Cromack | 349/57 |
| 4,736,225 | 4/1988 | Tanaka et al. | 355/1 |
| 4,913,536 | 4/1990 | Barnea | 350/419 |
| 5,189,500 | 2/1993 | Kusunoki | 349/17 |
| 5,317,433 | 5/1994 | Miyawaki et al. | 359/59 |
| 5,426,526 | 6/1995 | Yamamoto et al. | 349/42 |
| 5,513,028 | 4/1996 | Sono et al. | 349/42 |
| 5,530,266 | 6/1996 | Yonehara et al. | 349/43 |
| 5,541,746 | 7/1996 | Hamiagishi et al. | 349/62 |
| 5,619,601 | 4/1997 | Akashi et al. | 385/16 |
| 5,644,373 | 7/1997 | Furushima et al. | 349/158 |
| 5,654,811 | 8/1997 | Spitzer et al. | 349/42 |
| 5,680,186 | 10/1997 | Watanabe et al. | 349/95 |

FOREIGN PATENT DOCUMENTS 2279797  1/1995  United Kingdom .

*Primary Examiner*—William L. Sikes
*Assistant Examiner*—Tarifur R. Chowdhury
*Attorney, Agent, or Firm*—Fitzpatrick, Cella, Harper & Scinto

[57] ABSTRACT

A compact liquid crystal display uses MOSFETs and polycrystal silicon TFTs as a peripheral drive circuit formed on a single-crystal silicon substrate. The single-crystal silicon substrate is partially hollowed out to form a display region that transmits light, and is bonded to a polarizing plate attached to a plane of a prism. In this manner, high-power transistors can be used for a peripheral drive circuit, and the polarizing plate can be directly attached to the substrate.

13 Claims, 7 Drawing Sheets

LIQUID CRYSTAL DISPLAY DEVICE INCLUDING A TORIC PRISM LENS HAVING AN ASPHERIC MIRROR MOUNTED ON A POLARIZING MEANS

BACKGROUND OF THE INVENTION

1. Field of the Invention

The present invention relates to a liquid crystal display which can display images and pictures. More particularly, the invention relates to an active-matrix liquid crystal display.

2. Description of the Related Art

There has recently been a dramatic societal increase in communicating information using visual images and sound. To this end, cameras are becoming more compact and more powerful, and research and development into new types of cameras, such as digital 8 mm-VCR cameras and cameras using a semiconductor memory as a recording medium are being pursued. Similarly, it is necessary to create small goggle-type displays for applications such as three-dimensional virtual-reality games, the medical field and so on.

However, the displays which serve as interfaces between the user and such cameras have not yet been sufficiently miniaturized, which further hampers the downsizing of the overall system. Moreover, goggle-type displays are approximately two or three times as large as general-purpose ski goggles, thus producing discomfort and awkwardness when they are worn.

SUMMARY OF THE INVENTION

Accordingly, it is an object of the present invention to provide a more compact liquid crystal display.

It is a further object of the present invention to provide a smaller liquid crystal display with enhanced performance characteristics, including brightness contrast and resolution.

These objects and others have been accomplished by the present invention, in which an active-matrix liquid crystal display comprises: a thin film transistor provided for a display region; and a drive circuit disposed on a single-crystal silicon substrate and around the display region, wherein an optical member is directly attached to the single-crystal silicon substrate and is thus integrated thereto. In this liquid crystal display, the thin film transistor may preferably be a polycrystal silicon thin film transistor, and a hollowed-out portion from the single-crystal silicon substrate may preferably be used for the display region.

The optical member used in the present invention is preferably a polarizing plate, prism, lens, mirror, or a light source. When the optical member is a polarizing plate, the single-crystal silicon substrate may be grooved to form a ventilating opening between the substrate and the polarizing plate. When the optical member is a prism, lens or a mirror, an optical sensor is preferably mounted on the single-crystal silicon substrate and may preferably be located so that light from a light source can be incident on the optical sensor. Alternatively, the optical member is desirably located so that outside (external) light is incident on the optical sensor, preferably with a thin film for adjusting the level of admitted outside light. If the optical member is a light source, it is preferably a plane-type light source or a light emitting diode (LED). Further, when a LED is used as the light source, a common microlens is desirably provided for a plurality of pixels.

Further objects, features and advantages of the present invention will become apparent from the following detailed description of the invention with reference to the attached drawings.

DETAILED DESCRIPTION OF THE INVENTION

The present invention can be described in detail by way of reference to the Examples, below.

FIRST EXAMPLE

Figure 1:
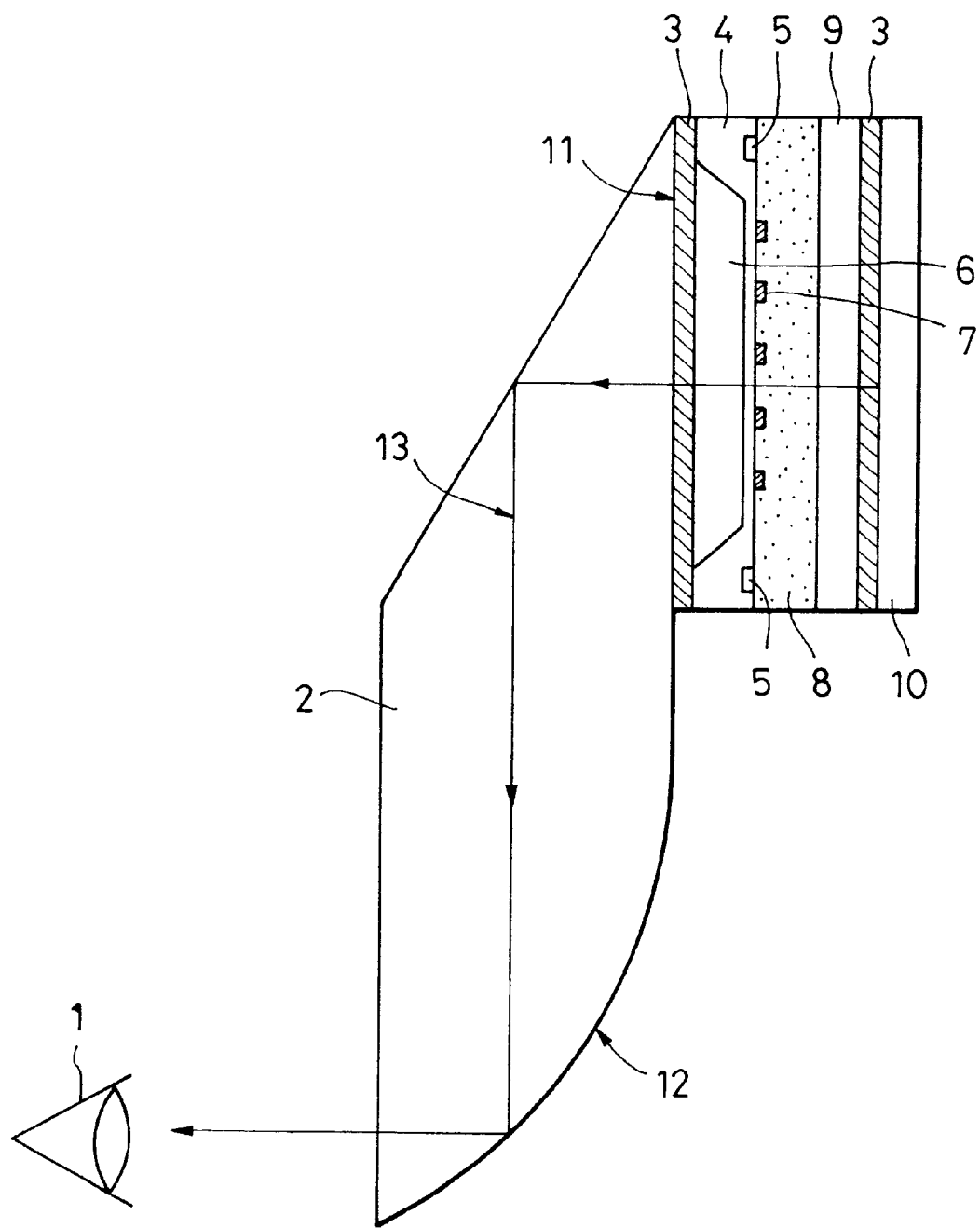
FIGS. 1 and 2 are sectional views of first and second embodiments of the present invention.

A first example of the present invention is depicted in FIG. 1. FIG. 1 is a sectional view of a head mount display, such as can be used for an 8 mm-VCR electronic viewfinder, a video game or medical equipment. The observer's eyes 1 are as shown. The display includes a toric prism 2, polarizing plates 3, a single-crystal silicon substrate 4, MOS field-effect transistors ("MOSFETs") 5 mounted on the surface of the silicon substrate 4, a hollowed portion 6 formed in the single-crystal silicon substrate 4 provided to transmit light, single-crystal thin film transistors ("TFTs") 7. Although not illustrated, the transistor's source is conventionally connected to a signal line, the drain is connected to a pixel electrode and a pixel voltage hold capacitor, and the gate is connected to a drive line. A liquid crystal layer 8 is disposed between the silicon substrate 4 and an opposing substrate 9. In general, any type of liquid crystal, such as a twisted nematic (TN), ferroelectric liquid crystal (FLC) or the like, can be used. The display also has a light source unit 10. Although in this embodiment, the polarizing plate 3 is directly connected to substrate 4, the prism 2 may be simply connected thereto.

The present invention, as described above, differs from conventional liquid crystal displays in the following respects.

(1) It is possible to dispose bipolar transistors 7, as well as the MOSFETs 5, on the silicon substrate 4 as required. Accordingly, by use of these high-power transistors, the present invention provides that the following circuits can be mounted on an extremely small area of the silicon substrate 4: a timing generation logic circuit used for generating timing for performing liquid crystal display, an analog circuit for performing γ conversion of video signals and generating inversion signals, and a shift register and a sampling transistor for sequentially sampling video signals, as well as a drive circuit for a light source. While it is not necessary to form all of these circuits onto substrate 4, this construction achieves further downsizing of the overall system. Of course, any suitable method for mounting these circuits onto substrate 4 may be utilized.

(2) Attaching the polarizing plate 3 to the plane 11 (see FIG. 1) of prism 2 protects polarizing plate 3 and eliminates the need for protective glass or the like, which is required for conventional displays. The absence of the protective glass decreases the internal reflection of light emitted from the light source 10 impinging on the prism plane 11 attached to the polarizing plate 3 through the pixel electrode attached to the drain.

Further, polarizing plate 3 attached to prism 2 is bonded to silicon substrate 4, which imparts stable TFT characteristics. (In contrast, a polarizing plate is conventionally attached directly to a substrate having TFTs. This disadvantageously varies the device characteristics, particularly, the threshold voltage Vth of polycrystal silicon TFTs, due to static electricity.) Additionally, the polarizing plate 3 is bonded to the silicon substrate 4 by means of a moisture-resistant adhesive, thereby preventing the entry of water, dirt, and the like into hollowed portion 6. The placement of the polarizing plate 3 directly between the prism 2 and the silicon substrate 4, in this manner, results in a stable, well-lit image display.

(3) High magnification and reduced distortion are achieved by reflecting light 13 on the aspheric mirror 12, as close as possible to the base of the prism 2. Further improvements over conventional displays can be achieved by decreasing the thickness of the silicon substrate 4 by means of backwrap, or the like.

SECOND EXAMPLE

Figure 2:
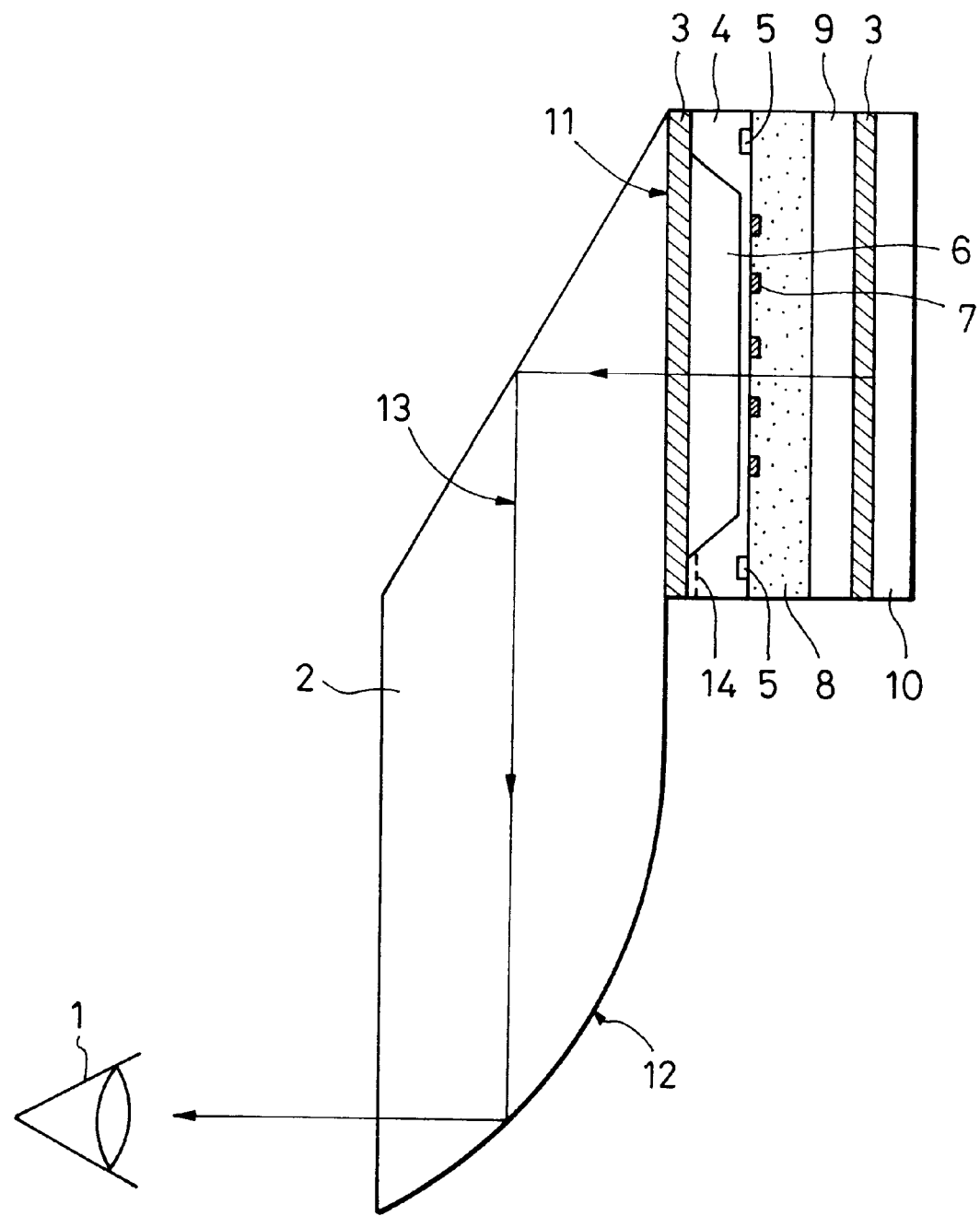

In this example, shown in FIG. 2, a ventilating opening 14 is formed between the substrate 4 and the optical member comprised of the prism 2 and the polarizing plate 3. The presence of the ventilating opening 14 reduces or eliminates the warp and peel-off that may result from stacking an optical member against a substrate. The opening 14 compensates for the disparity in the expansion coefficients between the different materials used for the two elements. In the liquid crystal display of this example, a peripheral drive circuit (unillustrated) is conventionally mounted on the silicon substrate 4. The substrate 4 can readily be grooved using a mask material, such as $SiO_2$, SiN and the like, and an etching liquid, such as tetramethylammonium hydroxide (TMAH) and the like. All other elements 1 through 13 in FIG. 2, and FIGS. 3 to 7 discussed below, are described in FIG. 1.

Figure 3:
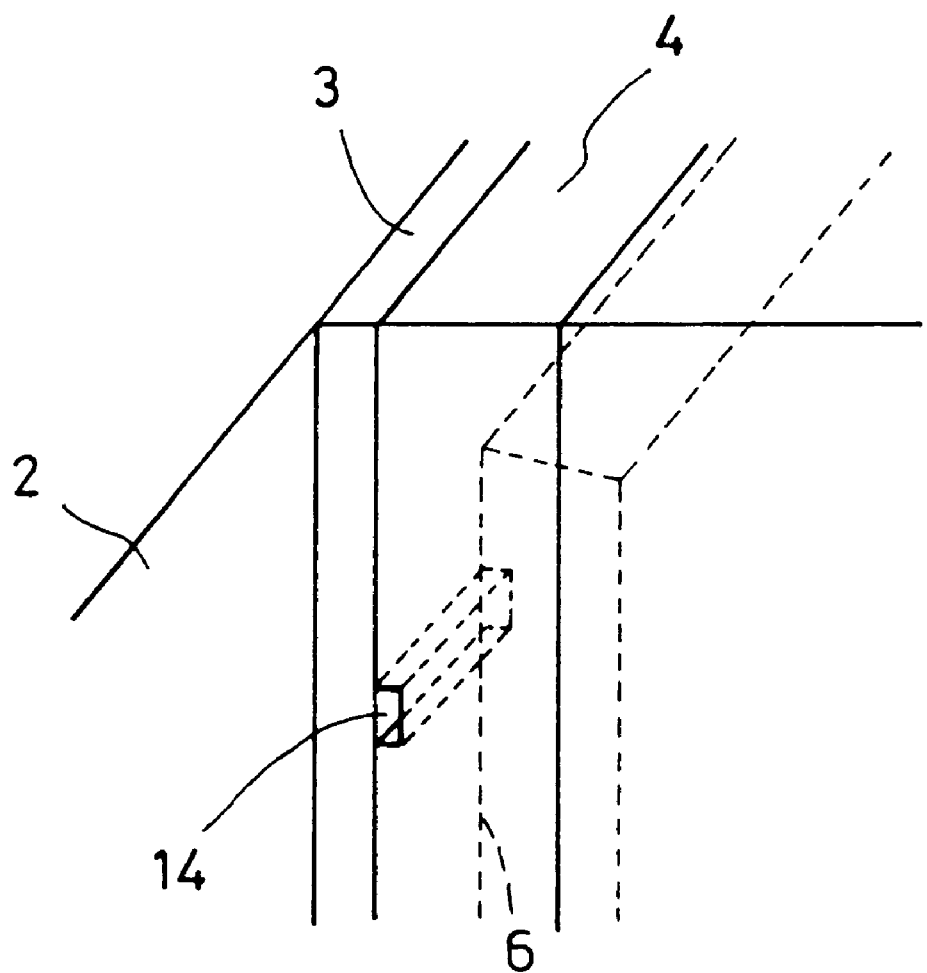
FIG. 3 is a partially enlarged detail view of the embodiment shown in FIG. 2.

FIG. 3 is an enlarged view of the joint portion between the prism 2 and the substrate 4. As shown, the silicon substrate 4 is grooved in the above-described manner to form the ventilating opening 14 between the polarizing plate 3 and the substrate 4. Any pressure change in the hollowed portion 6 caused by a temperature increase can be adjusted through the opening 14, resulting in consistent display characteristics. The opening 14 also aerates the hollowed portion 6, thereby reducing any adverse impact of water that may enter, and additionally reducing the requirements of the adhesive used to bond the polarizing plate 3 to substrate 4.

THIRD EXAMPLE

Figure 4:
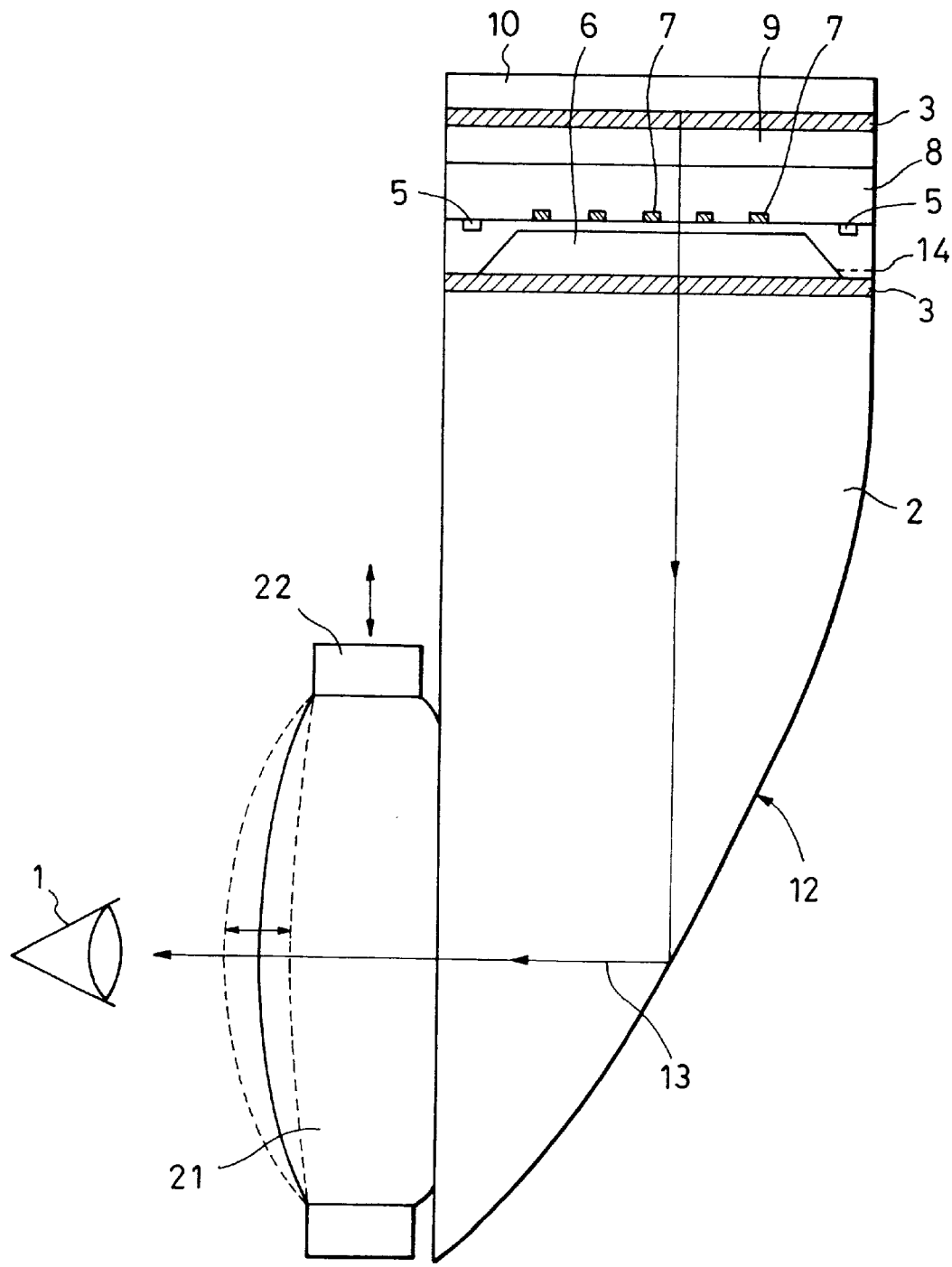
FIGS. 4 to 7 are sectional views of four additional embodiments of the present invention.

A third example of the present invention as shown in FIG. 4 contains a variable power lens 21 in the vicinity of the prism 2. The variable lens 21 is formed of a liquid, a gel or the like, with a pressure-applying means 22 disposed on the peripheral ends of the lens 21. Of course, if the lens 21 contains a liquid, it is covered with a solid transparent material.

Pressure is applied to the lens 21 by the pressure-applying means 22 so as to alter the curvature of the lens 21 in order to increase the power of the lens 21. Any warp and aberration caused by the lens 21 can be corrected by the aspheric mirror 12 located on the plane of the prism 2. By this arrangement, the observer's diopter arrangement can be achieved, thereby solving the conventional problem of the difficulty in recognizing images.

FIG. 4 clearly shows a liquid panel disposed within the thickness of the prism 2. Since the thickness of the prism 2 is on the order of approximately 10 mm, it is necessary that the 100,000 to 300,000-pixel display devices be contained within that space. Such can be accomplished in this invention, because single-crystal silicon transistors are used for the peripheral drive and a scanning circuit can be formed, even at a several μm pixel pitch. This creates a microminiature panel to further downsize the overall optical system, and makes possible obtaining high-quality electronic pictures with a nearly eyeglass-sized device.

FOURTH EXAMPLE

Figure 5:
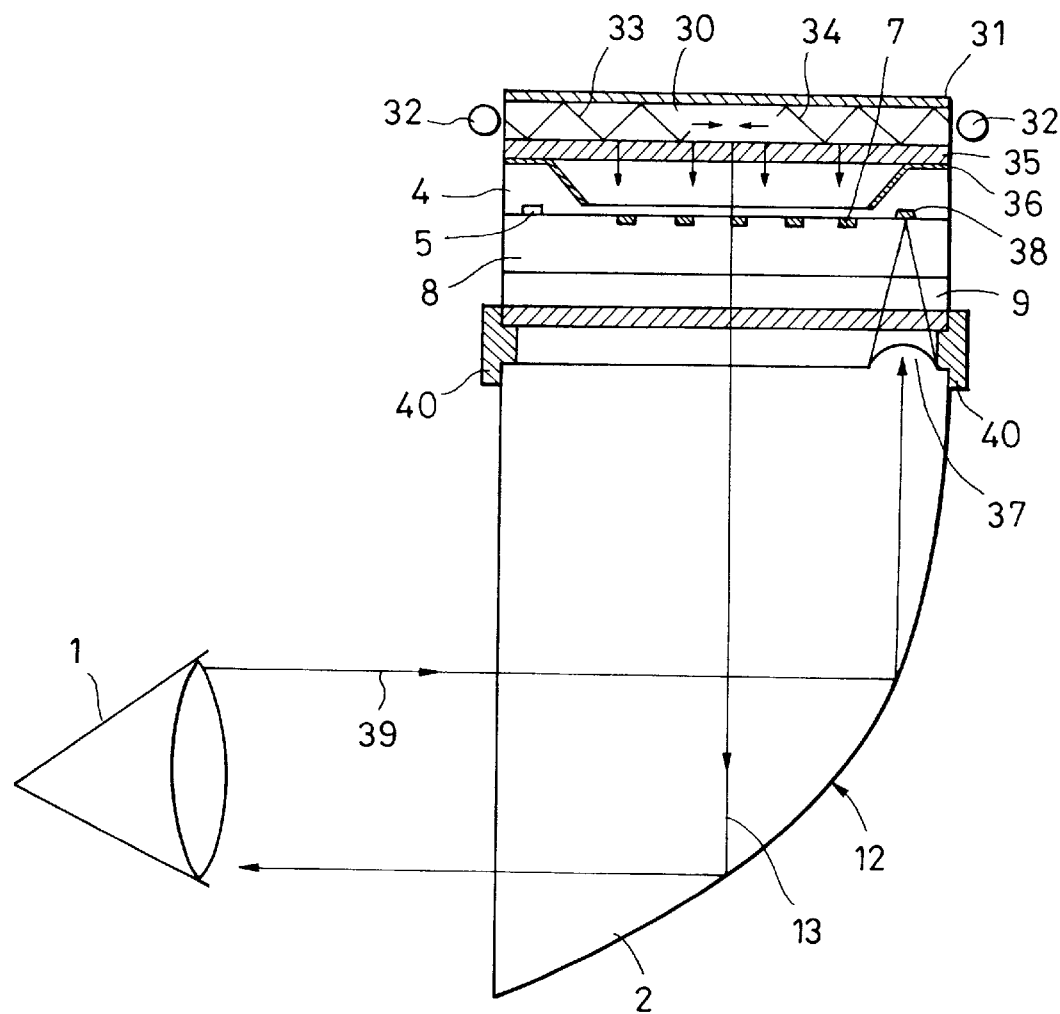

The fourth example of the present invention, as shown in FIG. 5, contains a waveguide 30, a reflection film 31, light sources 32 preferably formed of laser diodes ("LDs") or light-emitting diodes ("LEDs"), waveguide light 33 and 34, a light diffusion layer 35, a light-screening layer 36, an instrument 40 for connecting the opposing substrate 9 of the liquid crystal panel and the prism 2. In this example, the waveguide light 33 and 34, emitted from the light source 32 and impinging on the waveguide 30, partially leaks into the light diffusion layer 35 while repeating total reflection, and is then guided to the liquid crystal panel.

A lens 37, provided for part of the prism 2, may comprise an ordinary symmetrical lens or a cylindrical lens. An optical sensor 38, mounted on the silicon substrate 4, may employ a linear line sensor or a two-dimensional area sensor. In this example, an image from the observers's eyes is formed on the sensor 38 through the lens 37.

The light sources 32 are positioned in a plurality of regions, thereby avoiding the problem of variations in the luminance, i.e., only the region adjacent to the incident light has higher luminance. Moreover, the use of the LDs for the light sources 32 obviates the need for the polarizing plate 3, since the light sources 32 have only the unidirectional polarizing component. FIG. 5 shows the light sources 32 disposed adjacent to the hollowed portion for the display region of the silicon substrate 4. The sensor 38, which detects the reflected light from the observer eyes 1, is provided on the opposite side of the substrate 4. Accordingly, substrate 4 is protected from intense light by placement of the light-screening layer 36 between the light sources 32 and substrate 4.

In operation, light modulated in the liquid crystal layer 8 is incident on the observer eyes 1 through the prism 2. The reflected light from the eyes 1 reaches the sensor 38, mounted on the surface of the substrate 4, through the prism 2, as indicated by reference numeral 39. Image formation occurs in the sensor 38.

Generally, the light sources 32 may be used to emit light to reach the eyes 1 and reflect it therefrom. Alternatively, an extra LED as a light source may be provided to illuminate the eyes and reflect it therefrom. The liquid crystal panel and the prism 2 are positioned with high precision, being adjusted by the instrument 40, across an adequate spacing in which the lens 37 can sufficiently serve its function. The lens 37 may be integrally formed with the prism 2, or alternatively, a graded index lens whose refractive index is varied, or a plane lens, such as a Fresnel zoneplate, may be employed.

The features of the this example are summarized as follows.

(1) The plane-type light sources 32 double as a protective plate for the hollowed portion 6 of the silicon substrate 4. The absence of a protective plate makes it possible to attain a brighter display, as well as decreasing the number of parts and reducing costs.

(2) The opposing substrate 9 and the prism 2 can be secured with the use of the instrument 40, thereby decreasing positional deviation. Accordingly, image displays with less distortion and aberration can be obtained.

(3) A lens for detecting the observer's view is formed in part of the toric prism, and a sensor for picking up an image from the eyes is mounted on the silicon substrate 4. This arrangement makes it possible to implement a two-way display system that can modify an image according to the observer's view.

FIFTH EXAMPLE

Figure 6:
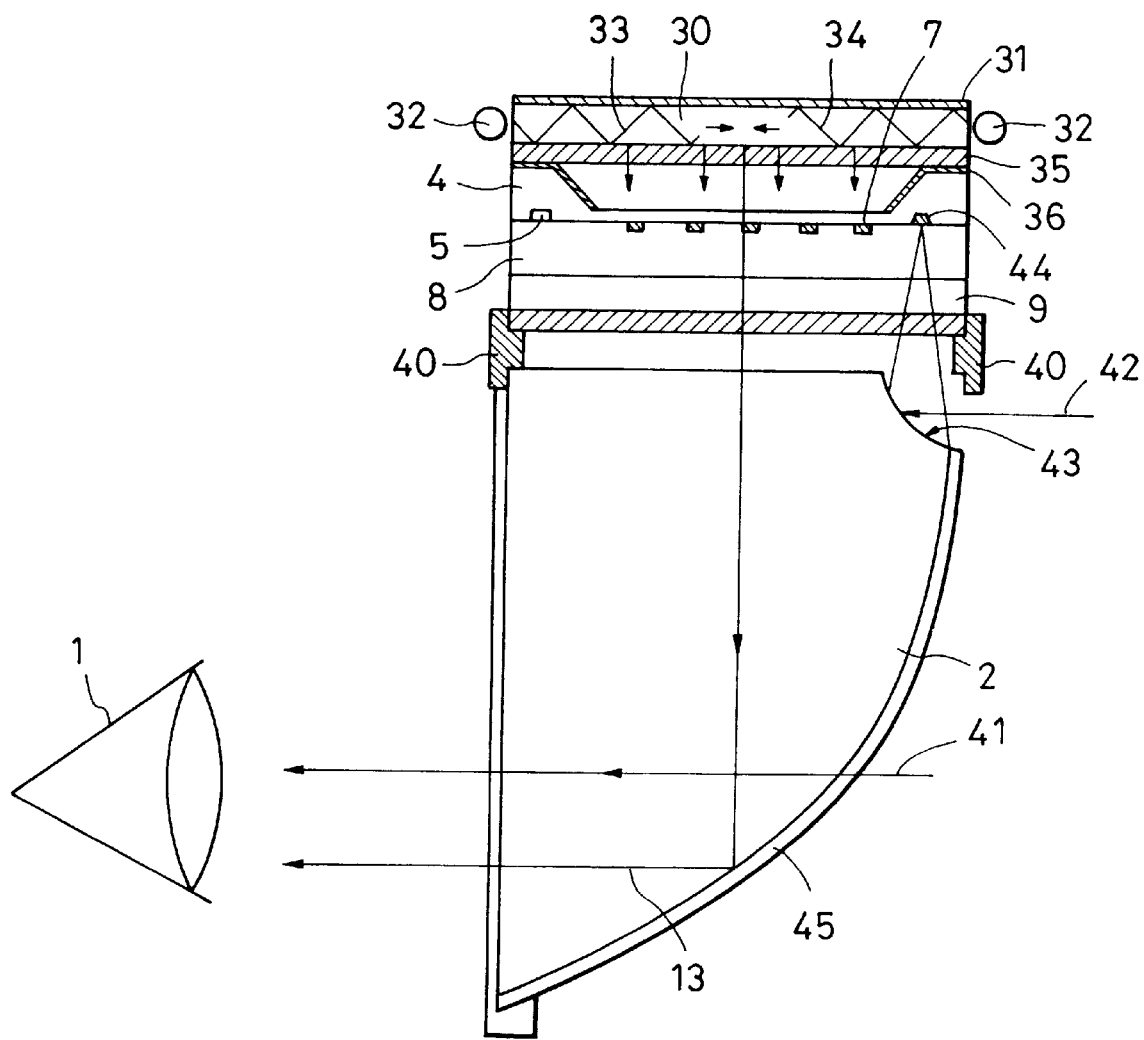

The fifth example of the present invention, as shown in FIG. 6, contains a display through which external information and electronic pictures can be observed at the same time or in turn by switching therebetween. FIG. 6 shows lights 41 and 42, a mirror lens 43 provided for portion of the prism 2, and a photometering sensor 44 for detecting the quantity level of the light entering the prism 2 and entering from an external light source. A film 45 is used for adjusting the amount of the external light functions as an electrochromic or photochromic thin film.

When simultaneously observing external information and an electronic picture, the amount of light 42 is detected in the photometering sensor 44 through the lens 43. If the external light is intense, the amount of the light entering the prism 2 is decreased by adjusting the film 45, in response to a signal from the sensor 44. By way of example, to repair an airplane, the design drawing, overlaid on the actual object, is displayed and a desired part is selected from the list displayed on an electronic picture. A reliable repair operation is thus enabled. In addition to this type of procedure, this embodiment is effective in surgical operations, factory assembly, etc.

SIXTH EXAMPLE

Figure 7:
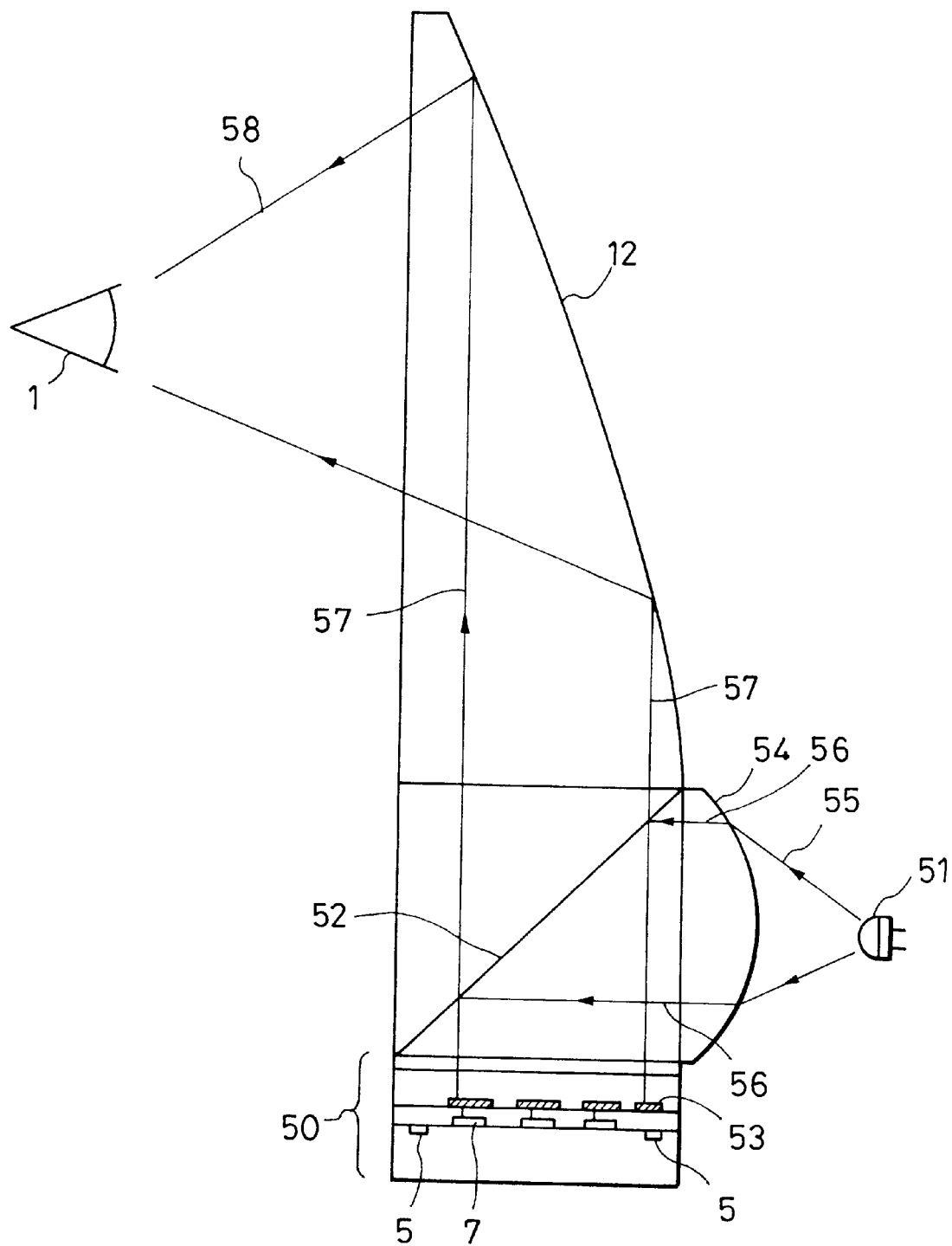

The sixth example of the present invention, as shown in FIG. 7, contains a reflection-type liquid crystal display panel 50 using polycrystal silicon TFTs as pixel switching devices and employing single-crystal transistors as a peripheral circuit. The liquid crystal display includes an LED light source 51, a collimator lens 54, a polarization beam splitter 52, and reflection electrodes 53 connected to the drains of the respective polycrystal silicon TFTs.

In this example, a beam 55 emitted from the LED 51 is formed into a collimated light beam, as indicated by reference numeral 56, via the lens 54. The light further changes its direction toward the LCD panel by the beam splitter 52. The reflected light 57 from the LCD panel passes through the beam splitter 52 and enters the eyes 1, as indicated by reference numeral 58, since the polarization of the light 57 is modulated in the liquid crystal layer.

Although in this embodiment only a single LED light source is used, light sources having three colors, Red (R), Green (G) and Blue (B) may be spatially displaced, and a common microlens for three R, G and B pixels is disposed on the surface of the reflection panel. This achieves a color and bright display without requiring the use of a color filter.

While the present invention has been described with reference to what are presently considered to be the preferred embodiments, it is to be understood that the invention is not limited to the disclosed embodiments. Accordingly, the invention is intended to cover various modifications and equivalent arrangements included within the spirit and scope of the appended claims.

What is claimed is:

1. A liquid crystal display comprising:
    liquid crystal panel which comprises a single-crystal silicon substrate having a display region, an opposing substrate to said silicon substrate, a liquid crystal layer disposed between said silicon substrate and said opposing substrate, and a drive circuit disposed on said single-crystal silicon substrate;
    a polarizing means mounted on said liquid crystal panel; and
    a toric prism lens having an aspheric mirror mounted on said polarizing means,
    wherein said single-crystal silicon substrate has a hollow portion and a groove which functions as a ventilating opening to the hollow portion.

2. A liquid crystal display according to claim 1, wherein a plurality of transistors are formed in said display region.

3. A liquid crystal display according to claim 2, wherein said transistors are polycrystal silicon thin film transistors.

4. A liquid crystal display comprising:
    a liquid crystal panel which comprises a single-crystal silicon substrate having a display region, an opposing substrate to said silicon substrate, a liquid crystal layer disposed between said silicon substrate and said opposing substrate, and a drive circuit disposed on said single-crystal silicon substrate;
    a polarizing means mounted on said liquid crystal panel; and
    a toric prism lens having an aspheric mirror mounted on said polarizing means,
    wherein the liquid crystal display further comprises a variable power lens.

5. A liquid crystal display comprising:
    a liquid crystal panel which comprises a single-crystal silicon substrate having a display region, an opposing substrate to said silicon substrate, a liquid crystal layer disposed between said silicon substrate and said opposing substrate, a drive circuit disposed on said single-crystal silicon substrate;
    a prism lens mounted on said liquid crystal panel;
    a sensor for picking up an image from an observer's eye; and
    a lens for forming an observer's view on said sensor.

6. A liquid crystal display according to claim 5, wherein the liquid crystal display further comprises a light source.

7. A liquid crystal display according to claim 6, wherein light emitted from said light source is guided to the liquid crystal panel.

8. A liquid crystal display according to claim 5, wherein the liquid crystal display further comprises a waveguide.

9. A liquid crystal display according to claim 5, wherein a plurality of transistors are formed in said display region.

10. A liquid crystal display comprising:
    a liquid crystal panel which comprises a single-crystal silicon substrate having a display region, an opposing substrate to said silicon substrate, a liquid crystal layer disposed between said silicon substrate and said opposing substrate, a drive circuit disposed on said single-crystal silicon substrate;
    a prism lens mounted on said liquid crystal panel;
    a photometering sensor for detecting light entering said prism; and
    an adjusting means mounted on said prism lens for controlling the amount of light entering said prism.

11. A liquid crystal display according to claim 10, wherein a mirror which reflects an external light to said photometering sensor is provided on said prism lens.

12. A liquid crystal display according to claim 10, wherein said adjusting means comprises a film.

13. A liquid crystal display according to claim 10, wherein a plurality of transistors are formed in said display region.

* * * * *

UNITED STATES PATENT AND TRADEMARK OFFICE
CERTIFICATE OF CORRECTION

PATENT NO.    : 5,999,237
DATED         : December 7, 1999
INVENTOR(S)   : MAMORU MIYAWAKI It is certified that error appears in the above-identified patent and that said Letters Patent is hereby corrected as shown below:

COLUMN 1:

Line 34, "brightness" should read --brightness,--.

COLUMN 2:

Line 4,  "detail" should read --detailed--; and
    Line 25, "light," should read --light, and--.

COLUMN 4:

Line 32, "observer" should read --observer's--; and
    Line 38, "observer" should read --observer's--.

UNITED STATES PATENT AND TRADEMARK OFFICE
CERTIFICATE OF CORRECTION

PATENT NO.   : 5,999,237
DATED        : December 7, 1999
INVENTOR(S)  : MAMORU MIYAWAKI It is certified that error appears in the above-identified patent and that said Letters Patent is hereby corrected as shown below:

COLUMN 5:

Line 59, "liquid" should read --a liquid--.

Signed and Sealed this

Thirtieth Day of January, 2001

Attest:

Attesting Officer

Q. TODD DICKINSON
Director of Patents and Trademarks